(12) United States Patent
Fan et al.

(10) Patent No.: US 11,928,493 B2
(45) Date of Patent: Mar. 12, 2024

(54) SHARING OF FPGA BOARD BY MULTIPLE VIRTUAL MACHINES

(71) Applicant: ZHENGZHOU YUNHAI INFORMATION TECHNOLOGY CO., LTD., Henan (CN)

(72) Inventors: Jiaheng Fan, Henan (CN); Rui Hao, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 471 days.

(21) Appl. No.: 17/281,593

(22) PCT Filed: Aug. 30, 2019

(86) PCT No.: PCT/CN2019/103675
§ 371 (c)(1),
(2) Date: Mar. 31, 2021

(87) PCT Pub. No.: WO2020/119189
PCT Pub. Date: Jun. 18, 2020

(65) Prior Publication Data
US 2021/0373928 A1 Dec. 2, 2021

(30) Foreign Application Priority Data
Dec. 13, 2018 (CN) .......................... 201811527156.X

(51) Int. Cl.
*G06F 9/455* (2018.01)

(52) U.S. Cl.
CPC .. *G06F 9/45558* (2013.01); *G06F 2009/4557* (2013.01); *G06F 2009/45579* (2013.01); *G06F 2009/45595* (2013.01)

(58) Field of Classification Search
CPC ....... G06F 9/45558; G06F 2009/45579; G06F 2009/45595
See application file for complete search history.

(56) References Cited

U.S. PATENT DOCUMENTS

| 9,008,085 B2 * | 4/2015 | Kamble | ................ H04L 67/568 370/469 |
| 10,678,584 B2 * | 6/2020 | Liu | ..................... G06F 9/45558 |

(Continued)

FOREIGN PATENT DOCUMENTS

| CN | 106354544 A | 1/2017 |
| CN | 107977256 A | 5/2018 |

(Continued)

OTHER PUBLICATIONS

International Search Report for PCT/CN2019/103675 dated Nov. 28, 2019, ISA/CN.

(Continued)

*Primary Examiner* — Benjamin C Wu
(74) *Attorney, Agent, or Firm* — Yue (Robert) Xu; Apex Attorneys at Law, LLP

(57) ABSTRACT

A method, system and apparatus for the sharing of an FPGA board by multiple virtual machines. Specifically, in the present application, a PCIE virtual layer (comprising a plurality of PCIE virtual sub-layers) and a virtual PCIE device are created; one virtual machine corresponds to one virtual PCIE device, multiple virtual PCIE devices correspond to one PCIE virtual sub-layer, and one PCIE virtual sub-layer corresponds to one FPGA board, thus enabling multiple virtual machines to share and use the FPGA board through one PCIE virtual sub-layer (that is, the multiple virtual machines share one PCIE bus, and same all access the FPGA board through the PCIE bus), thereby solving the problem of some of the virtual machines being unable to be (Continued)

started at the same time, and enhancing the experience effect of a user.

12 Claims, 3 Drawing Sheets

(56) References Cited

U.S. PATENT DOCUMENTS

| | | | | |
|---|---|---|---|---|
| 2012/0151004 | A1* | 6/2012 | Pope | G06Q 40/04 709/219 |
| 2014/0059537 | A1* | 2/2014 | Kamble | H04W 40/02 718/1 |
| 2016/0321209 | A1 | 11/2016 | Kishi et al. | |
| 2017/0126487 | A1* | 5/2017 | Xie | H04L 45/54 |
| 2017/0195173 | A1* | 7/2017 | Izenberg | G06F 9/5044 |
| 2019/0213029 | A1 | 7/2019 | Liu et al. | |
| 2023/0016692 | A1* | 1/2023 | Kim | G06F 9/45558 |

FOREIGN PATENT DOCUMENTS

| | | |
|---|---|---|
| CN | 108319563 A | 7/2018 |
| CN | 109634720 A | 4/2019 |

OTHER PUBLICATIONS

Thoma, Yann et al., FPGA-GPU communicating through PCIe, Microprocessors and Microsystems, vol. 39, No. 7, Oct. 31, 2015, pp. 565-575.

\* cited by examiner

SHARING OF FPGA BOARD BY MULTIPLE VIRTUAL MACHINES

The present application is the national stage of International Application No. PCT/CN2019/103675, titled "METHOD, SYSTEM AND APPARATUS FOR SHARING OF FPGA BOARD BY MULTIPLE VIRTUAL MACHINES", filed on Aug. 30, 2019, which claims the priority to Chinese Patent Application No. 201811527156.X, titled "METHOD, SYSTEM AND APPARATUS FOR SHARING FPGA BOARD AMONG MULTIPLE VIRTUAL MACHINES", filed on Dec. 13, 2018 with the China National Intellectual Property Administration, which is incorporated herein by reference in its entirety.

FIELD

The present disclosure relates to the technical field of cloud servers, and in particular to a method, a system, and an apparatus for sharing a FPGA board among multiple virtual machines.

BACKGROUND

A cloud server is a simple, efficient, safe, and reliable computing service with elastically scalable processing capabilities. Users do not have to purchase any hardware, and can deploy any server only by applying for resources on the cloud server. Currently, multiple virtual machines are usually deployed on a cloud server, so that multiple users can perform operations simultaneously without mutual interference. In some scenarios that require high computing capabilities, such as artificial intelligence and deep learning, the cloud server requires FPGA (Field-Programmable Gate Array) boards plugged via PCIE (Peripheral Component Interconnect Express) connectors. Thereby, logical computing capabilities of the cloud serve are expanded to support these scenarios.

In conventional, one FPGA board is only capable to serve one virtual machine. A limited quantity of PCIE connectors of the cloud server results in a limited quantity of FPGA boards that can be connected. A part of virtual machines is not provided with a corresponding FPGA board, in a case that the quantity of virtual machines running on a cloud server is greater than the quantity of FPGA boards. In such case, a time-sharing manner is adopted to enable each virtual machine to use a FPGA board. In the time-sharing manner, the virtual machines sharing a same FPGA board cannot be activated at the same time, which reduces user experience.

Therefore, those skilled in the art need to solve the above technical problem.

SUMMARY

An objective of the present disclosure is to provide a method, a system, and an apparatus for sharing a FPGA board among multiple virtual machines. Multiple virtual machines can share the FPGA board while addressing an issue that a part of virtual machines cannot be simultaneously activated. User experience is improved.

In order to address the above technical issue, a method for sharing a FPGA board among multiple virtual machines is provided according to embodiments of the present disclosure. The method includes:

establishing a PCIE virtual layer in a host system of a cloud server in advance, where the PCIE virtual layer includes a PCIE virtual sub-layer that is in one-to-one correspondence with a FPGA board, and the FPGA board is an acceleration card shared among virtual machines configured in the cloud server;

selecting, for each PCIE virtual sub-layer, virtual machines interacting with said PCIE virtual sub-layer, from the virtual machines configured in the cloud server in advance; and creating, in each PCIE virtual sub-layer, virtual PCIE devices that are in one-to-one correspondence with the virtual machines interacting with said PCIE virtual sub-layer;

loading a first virtual PCIE device onto a first virtual machine of the virtual machines configured in the cloud server, after the first virtual machine is activated, where the first virtual PCIE device is in a first PCIE virtual sub-layer, and corresponds to the first virtual machine; and receiving, via the first virtual PCIE device, to-be-processed data from the first virtual machine; and sending, through the first PCIE virtual sub-layer, the to-be-processed data to a first FPGA board corresponding to the first PCIE virtual sub-layer, to enable the first FPGA board to perform data processing according to a preset sharing mode in response to more than one of the virtual machines configured in the cloud server sending respective to-be-processed data simultaneously, and return the processed data correspondingly to the virtual machines configured in the cloud server.

In a preferable embodiment, establishing the PCIE virtual layer in the host system of the cloud server in advance, selecting, for each PCIE virtual sub-layer, the virtual machine interacting with said PCIE virtual sub-layer from the virtual machines in advance, and creating, in each PCIE virtual sub-layer, the virtual PCIE device that is in one-to-one correspondence with the virtual machine interacting with said PCIE virtual sub-layer, includes:

acquiring a quantity of FPGA boards provided for the virtual machines configured in the cloud server, and a quantity of the virtual machines configured in the cloud server;

determining, from all FPGA boards, the FPGA board that is shared among more than one of the virtual machines configured in the cloud server, and determining, from all virtual machines, virtual machines sharing the FPGA board, in response to the quantity of the FPGA boards being less than the quantity of the virtual machines, to allocate each virtual machine to one of the FPGA boards;

establishing the PCIE virtual layer in the host system of the cloud server, where the PCIE virtual layer includes the PCIE virtual sub-layer that is in one-to-one correspondence with the FPGA board shared among the more than one of the virtual machines, and determining, for each PCIE virtual sub-layer, the virtual machines interacting with said PCIE virtual sub-layer, according to a result of the allocating, and creating, in each PCIE virtual sub-layer, the virtual PCIE devices that are in one-to-one correspondence with the virtual machines interacting with said PCIE virtual sub-layer.

In a preferable embodiment, receiving, via the first virtual PCIE device, the data to be processed by the first virtual machine and sending, through the first PCIE virtual sub-layer, the data to the first FPGA board corresponding to the first PCIE virtual sub-layer includes:

receiving, via the first virtual PCIE device, the to-be-processed data from the first virtual machine, and writing the to-be-processed data into a shared memory in the first PCIE virtual sub-layer, to send the to-be-processed data through the first PCIE virtual sub-layer to the first FPGA board, where the shared memory is preset for the first virtual PCIE device.

In a preferable embodiment, the preset sharing mode is set by:

setting a priority in advance for each virtual machine sharing the same FPGA board; and performing, by the FPGA board, the data processing according to the priority, in response to the more than one of the virtual machines configured in the cloud server sending respective to-be-processed data simultaneously, where the higher the priority of a virtual machine is, the earlier the to-be-processed data from the virtual machine is processed in the data processing.

In a preferable embodiment, the preset sharing mode is set by:

performing, by the FPGA board, the data processing according to a first-in-first-out rule, in response to the more than one of the virtual machines configured in the cloud server sending respective to-be-processed data simultaneously.

In a preferable embodiment, the method further includes:

updating, in response to a sharing relationship among the virtual machines configured in the cloud server being changed, the PCIE virtual layer and the PCIE virtual devices according to the changed sharing relationship.

In order to address the above technical issue, a system for sharing a FPGA board among multiple virtual machines is provided according to embodiments of the present disclosure. The system includes:

an establishing module, configured to: establish a PCIE virtual layer in a host system of a cloud server in advance, where the PCIE virtual layer includes a PCIE virtual sub-layer that is in one-to-one correspondence with a FPGA board, and the FPGA board is an acceleration card shared among virtual machines configured in the cloud server; and for each PCIE virtual sub-layer: select, from the virtual machines configured in the cloud server in advance, virtual machines interacting with said PCIE virtual sub-layer, and create, in said PCIE virtual sub-layer, virtual PCIE devices that are in one-to-one correspondence with the virtual machines interacting with said PCIE virtual sub-layer;

a virtual-device loading module, configured to load a first virtual PCIE device onto a first virtual machine of the virtual machines configured in the cloud server, after the first virtual machine is activated, where the first virtual PCIE device is in a first PCIE virtual sub-layer, and corresponds to the first virtual machine; and a data processing module, configured to: receive, via the first virtual PCIE device, to-be-processed data from the first virtual machine; and send, through the first PCIE virtual sub-layer, the to-be-processed data to a first FPGA board corresponding to the first PCIE virtual sub-layer, to enable the first FPGA board to perform data processing according to a preset sharing mode in response to more than one of the virtual machines configured in the cloud server sending respective to-be-processed data simultaneously, and return the processed data correspondingly to the virtual machines configured in the cloud server.

In a preferable embodiment, the establishing module includes:

a quantity acquiring unit, configured to acquire a quantity of FPGA boards provided for the virtual machines configured in the cloud server, and acquire a quantity of the virtual machines configured in the cloud server;

a virtual-machine allocating unit, configured to: determine, from all FPGA boards, the FPGA board that is shared among more than one of the virtual machines configured in the cloud server; and determine, from all virtual machines, virtual machines sharing the FPGA board, in response to the quantity of the FPGA boards being less than the quantity of the virtual machines, to allocate each virtual machine to one of the FPGA boards;

a virtual-device establishing unit, configured to create the PCIE virtual layer in the host system of the cloud server, where the PCIE virtual layer includes the PCIE virtual sub-layer that is in one-to-one correspondence with the FPGA board shared among more than one of the virtual machines; and a virtual-device creating unit, configured to: determine, for each PCIE virtual sub-layer, the virtual machines interacting with said PCIE virtual sub-layer, according to a result of the allocating; and create, in said PCIE virtual sub-layer, the virtual PCIE devices that are in one-to-one correspondence with the virtual machines interacting with said PCIE virtual sub-layer.

In a preferable embodiment, the system includes:

an updating module, configured to update, in response to a sharing relationship among the virtual machines configured in the cloud server being changed, the PCIE virtual layer and the PCIE virtual devices according to the changed sharing relationship.

In order to address the above technical issue, an apparatus for sharing a FPGA board among multiple virtual machines is provided according to embodiments of the present disclosure. The apparatus includes:

a memory, configured to store a computer program, and a processor, configured to implement any foregoing method when executing the computer program.

The method for sharing the FPGA board among the multiple virtual machines is provided according to embodiments of the present disclosure. The method includes following steps. The PCIE virtual layer is established in the host system of the cloud server in advance, where the PCIE virtual layer includes the PCIE virtual sub-layer that is in one-to-one correspondence with the FPGA board, and the FPGA board is the acceleration card shared among the virtual machines configured in the cloud server. For each PCIE virtual sub-layer, the virtual machines interacting with said PCIE virtual sub-layer are selected in advance from the virtual machines configured in the cloud server, and the virtual PCIE devices that are in one-to-one correspondence with the virtual machines interacting with said PCIE virtual sub-layer are created in said PCIE virtual sub-layer. The first virtual PCIE device is loaded onto the first virtual machine of the virtual machines configured in the cloud server, after the first virtual machine is activated, where the first virtual PCIE device is in the first PCIE virtual sub-layer, and corresponds to the first virtual machine. The to-be-processed data is received via the first virtual PCIE device from the first virtual machine, and sent through the first PCIE virtual sub-layer to the first FPGA board corresponding to the first PCIE virtual sub-layer. Thereby, the first FPGA board is enabled to perform the data processing according to the preset sharing mode in response to the more than one of the virtual machines configured in the cloud server sending respective to-be-processed data simultaneously, and return the processed data correspondingly to the virtual machines configured in the cloud server.

In embodiments of the present disclosure, the PCIE virtual layer (including multiple PCIE virtual sub-layers) is established, and the virtual PCIE devices are created. The virtual machines are in one-to-one correspondence with the virtual PCIE devices, multiple virtual PCIE devices correspond to the PCIE virtual sub-layer, and the PCIE sub-virtual layer corresponds to the FPGA board. Therefore, multiple virtual machines can share the FPGA board via the PCIE virtual sub-layer (that is, multiple virtual machines share a PCIE bus, and access the FPGA board via the PCIE bus). Thus, addressed is an issue that a part of the virtual machines cannot be simultaneously activated, improving user experience.

The system and the apparatus for sharing the FPGA board among the multiple virtual machines are further provided according to embodiments of the present disclosure, and achieved similar beneficial effects of the method.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

The core of the present disclosure is to provide a method, a system, and an apparatus for sharing a FPGA board among multiple virtual machines. It is implemented that the multiple virtual machines share the FPGA while addressing an issue that a part of the virtual machines cannot be simultaneously activated, thereby improving user experience.

In order to help those skilled in the art better understand solutions of the present disclosure, hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 1:
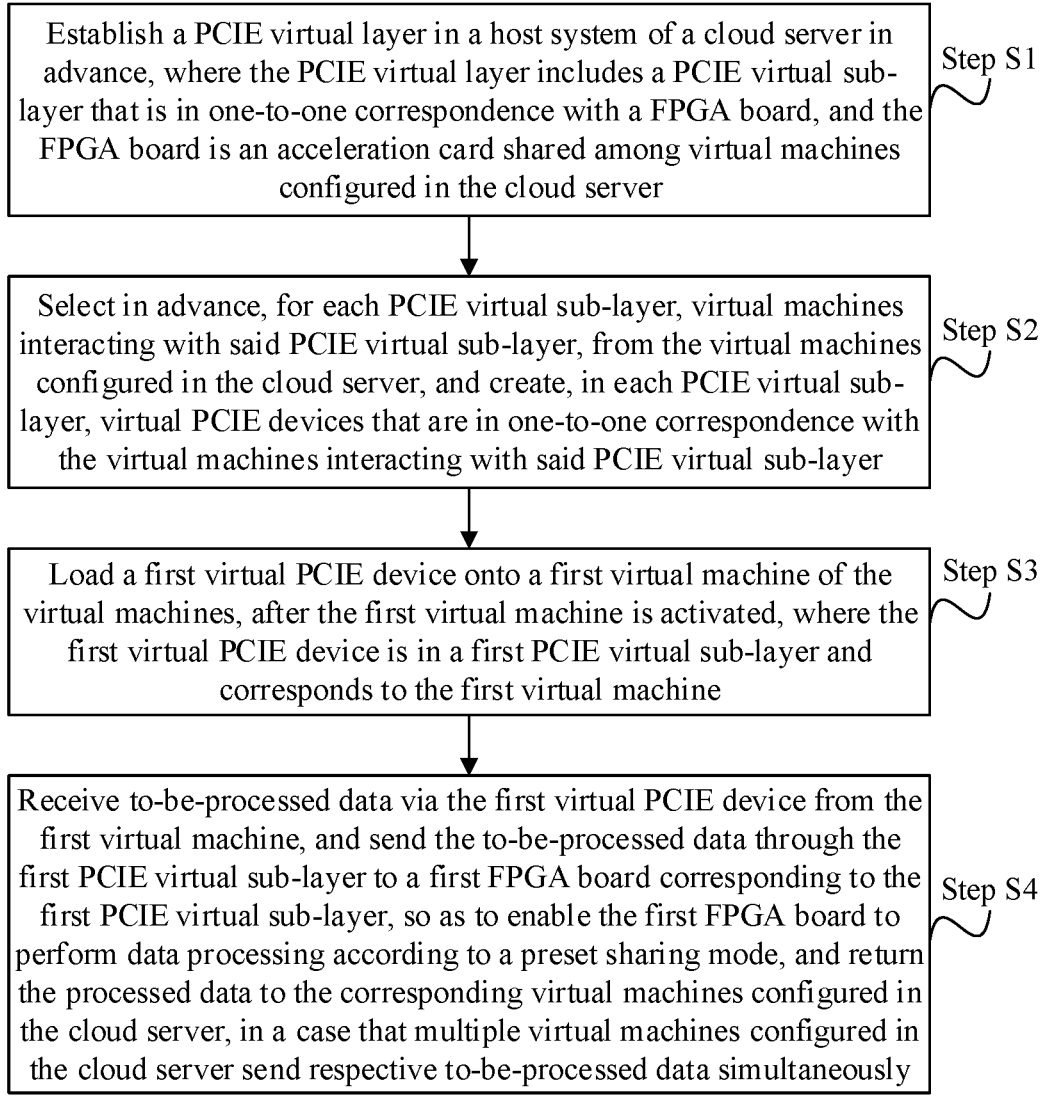
FIG. 1 is a method for sharing a FPGA board among multiple virtual machines according to an embodiment of the present disclosure.

Reference is made to FIG. 1, which is a method for sharing a FPGA board among multiple virtual machines according to an embodiment of the present disclosure.

The method includes steps S1 to S4.

In step S1, a PCIE virtual layer is established in a host system of a cloud server in advance. The PCIE virtual layer includes a PCIE virtual sub-layer that is in one-to-one correspondence with a FPGA board, and the FPGA board is an acceleration card shared among virtual machines configured in the cloud server.

In a specific embodiment, multiple virtual machines are configured in the cloud server, and multiple FPGA boards are connected to the cloud server through PCIE connectors. In a case that the FPGA boards are not adequate for virtual machines to use, multiple virtual machines share one FPGA board in embodiment of the present disclosures, to avoid that some virtual machines cannot be activated at the same time.

In embodiments of present disclosure, a quantity of FPGA boards that need to be shared is determined in advance, according to a quantity of virtual machines and a quantity of FPGA boards. Thereby, it is ensured that each virtual machine is provided with a corresponding FPGA board to accelerate data processing. For example, in a case that there are four virtual machines and three FPGA boards, the extra virtual machine needs to share a FPGA board with any of the other three virtual machines. Namely, in this case, the quantity of FPGA boards that need to be shared is one. For another example, in a case that there are four virtual machines and two FPGA boards, the four virtual machines may be divided into two groups, and each group of virtual machines share a FPGA board (as an example, three virtual machines form one group, and the rest virtual machine alone forms the other group, i.e., the quantity of FPGA boards that need to be shared is one; as another example, two virtual machines form one group, and the rest two virtual machines form the other group, i.e., the quantity of FPGA boards that need to be shared is two).

After the quantity of FPGA boards that needs to be shared is determined, the FPGA boards that need to be shared are selected from all FPGA boards based on the determined quantity. Accordingly, the PCIE virtual layer is established in the host system of the cloud server, and the PCIE virtual layer includes PCIE virtual sub-layers that are in one-to-one correspondence with the selected FPGA boards.

In step S2, for each PCIE virtual sub-layer, virtual machines interacting with said PCIE virtual sub-layer are selected in advance from the virtual machines configured in the cloud server, and virtual PCIE devices that are in one-to-one correspondence with the virtual machines interacting with said PCIE virtual sub-layer are created in said PCIE virtual sub-layer.

In a specific embodiment of the present disclosure, multiple virtual machines are allocated in advance to the selected FPGA board that needs to be shared, from all virtual machines. Thereby, each virtual machine is provided with a corresponding FPGA board to accelerate data processing. Namely, one PCIE virtual sub-layer corresponds to one shared FPGA board, and one shared FPGA board corresponds to multiple virtual machines allocated to such FPGA board (that is, one PCIE virtual sub-layer corresponds to multiple virtual machines). An ultimate objective of the present disclosure is that each PCIE virtual sub-layer exchanges data with multiple virtual machines corresponding thereto, and exchanges data with the FPGA board corresponding thereto via a PCIE driver (i.e., data exchange between the multiple virtual machines and the FPGA board is indirectly implemented). In other words, multiple virtual machines share a PCIE bus and access a same FPGA board via the PCIE bus, so that multiple virtual machines share the same FPGA board.

In a specific embodiment of the present disclosure, the virtual PCIE devices in one-to-one correspondence with the virtual machines, which interact with each PCIE virtual sub-layer, are created in said PCIE virtual sub-layer. For a virtual machine, the virtual machine treats the corresponding virtual PCIE device to as an FPGA board, and thereby identifies the computing resources of such FPGA board as exclusively occupied by itself.

Figure 2:
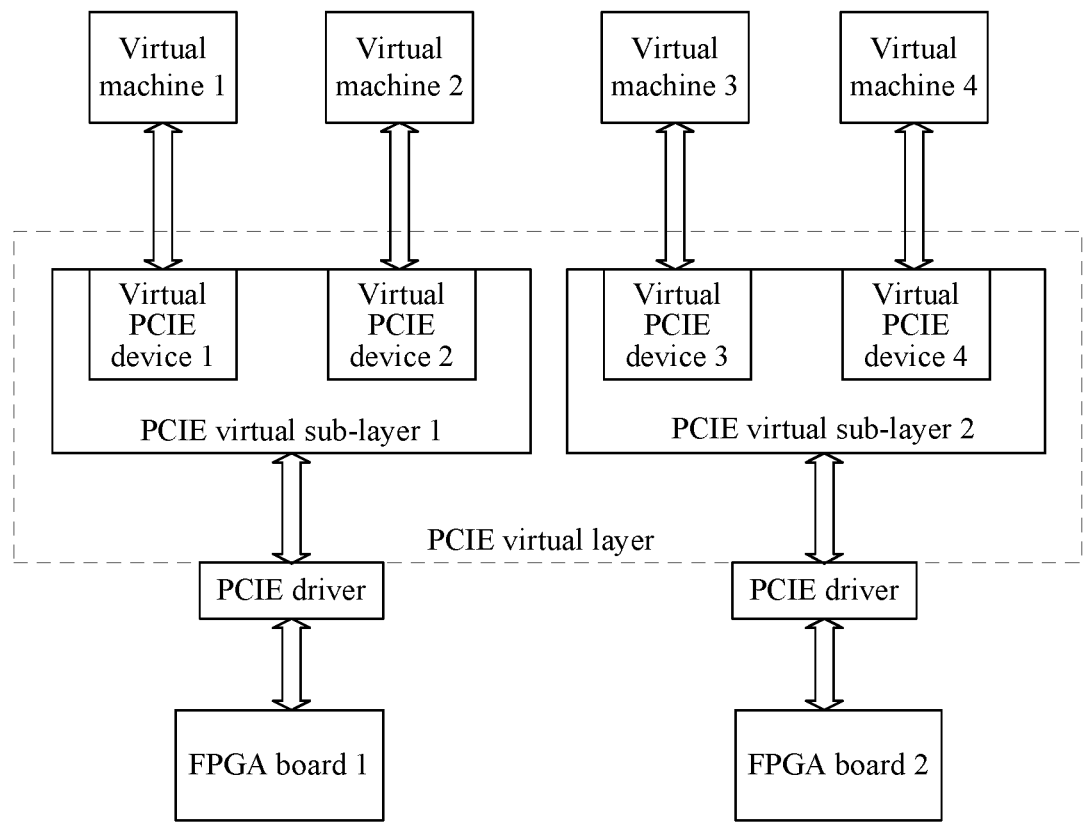
FIG. 2 is a schematic diagram of a principle of sharing a FPGA board among multiple virtual machines according to an embodiment of the present disclosure.

For example, reference is made to FIG. 2, which is a schematic diagram of a principle of sharing a FPGA board among multiple virtual machines according to an embodiment of the present disclosure. Virtual machine 1 and virtual machine 2 share FPGA board 1, and virtual machine 3 and virtual machine 4 share FPGA board 2. When establishing the PCIE virtual layer in the host system of the cloud server, PCIE virtual sub-layer 1 is established for FPGA board 1, and PCIE virtual sub-layer 2 is established for FPGA board 2. In PCIE virtual sub-layer 1, virtual PCIE device 1 is created for virtual machine 1, and virtual PCIE device 2 is created for virtual machine 2. In PCIE virtual sub-layer 2, virtual PCIE device 3 is created for virtual machine 3, and virtual PCIE device 4 is created for virtual machine 4. Thereby, it is implemented that the virtual PCIE devices and the virtual machines exchange data in one-to-one correspondence, and the PCIE virtual sub-layer manages data transmission and data reception unitedly.

In step S3, a first virtual PCIE device is loaded onto a first virtual machine of the virtual machines configured in the cloud server, after the first virtual machine is activated. The first virtual PCIE device is in a first PCIE virtual sub-layer, and corresponds to the first virtual machine.

In a specific embodiment of the present disclosure, after any (i.e. the first virtual machine) of the virtual machines sharing the FPGA board is activates, the first virtual machine loads the corresponding first PCIE virtual device in the first PCIE virtual sub-layer. Thereby, data communication between the first virtual machine and the first virtual PCIE device is established.

In step S4, to-be-processed data is received via the first virtual PCIE device from the first virtual machine, and is sent through the first PCIE virtual sub-layer to a first FPGA board corresponding to the first PCIE virtual sub-layer. Thereby, the first FPGA board is enabled to perform data processing according to a preset sharing mode and return the processed data to the corresponding virtual machines configured in the cloud server, in a case that multiple virtual machines configured in the cloud server send respective to-be-processed data simultaneously.

In embodiments of the present disclosure, what is preset is configured in advance and only needs to be set once. What is preset is not necessary to be modified, unless such modification is necessary in practice.

In a specific embodiment, after the data communication between the first virtual machine and the first virtual PCIE device is established, the first virtual machine can send to-be-processed data to the first virtual PCIE device when such data exists. After receiving the to-be-processed data, the first virtual PCIE device transmits the to-be-processed data to the first PCIE virtual sub-layer for management (where the first PCIE virtual sub-layer is aware of that the to-be-processed data is sent by the first virtual machine).

The first PCIE virtual sub-layer sends the to-be-processed data to the corresponding first FPGA board for processing. In a case that the first FPGA board receives to-be-processed data only from the first virtual machine, the first FPGA board directly processes the to-be-processed data of the first virtual machine, and returns the processed data to the first PCIE virtual sub-layer. Then, the processed data is returned to the first virtual machine via the first virtual PCIE device. In a case that the first FPGA board further receives to-be-processed data from another virtual machine besides that from the first virtual machine, the first FPGA board processes the to-be-processed data according to the preset sharing mode (which represents a rule of how to process to-be-processed data from multiple virtual machines, that is, a rule of determining an order of data processing), and returns the processed data to the first PCIE virtual sub-layer for unified management. Then, the first PCIE virtual sub-layer returns the processed data to the virtual machines via the corresponding virtual PCIE devices, respectively.

Reference is made to FIG. 2 as an example. In a case that virtual machine 1 and virtual machine 2 send the to-be-processed data at the same time, FPGA board 1 receives the to-be-processed data from both virtual machines, and performs data processing according to the preset sharing mode. A result of data processing corresponding to virtual machine 1 is returned to PCIE virtual sub-layer 1, and then returned to virtual machine 1 via virtual PCIE device 1. Similarly, a result of data processing corresponding to virtual machine 2 is returned to PCIE sub-virtual layer 1, and then returned to virtual machine 2 via virtual PCIE device 2.

The method for sharing the FPGA board among the multiple virtual machines is provided according to embodiments of the present disclosure. The method includes following steps. The PCIE virtual layer is established in the host system of the cloud server in advance, where the PCIE virtual layer includes the PCIE virtual sub-layer that is in one-to-one correspondence with the FPGA board, and the FPGA board is the acceleration card shared among the virtual machines configured in the cloud server. For each PCIE virtual sub-layer, the virtual machines interacting with said PCIE virtual sub-layer are selected in advance from the virtual machines configured in the cloud server, and the virtual PCIE devices that are in one-to-one correspondence with the virtual machines interacting with said PCIE virtual sub-layer are created in said PCIE virtual sub-layer. The first virtual PCIE device is loaded onto the first virtual machine of the virtual machines configured in the cloud server, after the first virtual machine is activated, where the first virtual PCIE device is in the first PCIE virtual sub-layer, and corresponds to the first virtual machine. The to-be-processed data is received via the first virtual PCIE device from the first virtual machine, and sent through the first PCIE virtual sub-layer to the first FPGA board corresponding to the first PCIE virtual sub-layer. Thereby, the first FPGA board is enabled to perform the data processing according to the preset sharing mode in response to the more than one of the virtual machines configured in the cloud server sending respective to-be-processed data simultaneously, and return the processed data correspondingly to the virtual machines configured in the cloud server.

In embodiments of the present disclosure, the PCIE virtual layer (including multiple PCIE virtual sub-layers) is established, and the virtual PCIE devices are created. The virtual machines are in one-to-one correspondence with the virtual PCIE devices, multiple virtual PCIE devices correspond to the PCIE virtual sub-layer, and the PCIE sub-virtual layer corresponds to the FPGA board. Therefore, multiple virtual machines can share the FPGA board via the PCIE virtual sub-layer (that is, multiple virtual machines share a PCIE bus, and access the FPGA board via the PCIE bus). Thus, addressed is an issue that a part of the virtual machines cannot be simultaneously activated, improving user experience.

Following optional embodiments are provided based on the forgoing embodiments.

In an optional embodiment, the steps S1 and S2 may include following steps.

A quantity of FPGA boards provided for the virtual machines configured in the cloud server is acquired, and a quantity of the virtual machines configured in the cloud server is acquired.

In a case that the quantity of the FPGA boards is less than the quantity of the virtual machines, the FPGA board that is shared among more than one of the virtual machines configured in the cloud server determining is determined from all FPGA boards, and virtual machines sharing the FPGA board is determined from all virtual machines. Thereby, each virtual machine is allocated to one of the FPGA boards.

The PCIE virtual layer is established in the host system of the cloud server. The PCIE virtual layer includes the PCIE virtual sub-layer that is in one-to-one correspondence with the FPGA board shared among the more than one of the virtual machines.

For each PCIE virtual sub-layer, the virtual machines interacting with said PCIE virtual sub-layer are determined according to a result of the allocation, and the virtual PCIE devices that are in one-to-one correspondence with the virtual machines interacting with said PCIE virtual sub-layer are created in said PCIE virtual sub-layer.

In a specific embodiment of the present disclosure, establishing the PCIE virtual layer and creating the virtual PCIE devices includes the following steps. The quantity of virtual machines configured in the cloud server and the quantity of FPGA boards connected to the cloud server are acquired in advance, and the quantity of virtual machines is compared with the quantity of FPGA boards. In a case that the quantity of FPGA boards is less than the quantity of the virtual machines, the FPGA boards are not adequate for the virtual machine to use. Therefore, multiple virtual machines may share one FPGA board. The foregoing embodiments have described in detail how to share the same FPGA board among the multiple virtual machines by establishing the PCIE virtual layer and creating the virtual PCIE devices, which is not repeated herein.

As an optional embodiment, the step S4 includes following steps.

The to-be-processed data is received via the first virtual PCIE device from the first virtual machine. The to-be-processed data is written into a shared memory in the first PCIE virtual sub-layer, so as to send the to-be-processed data through the first PCIE virtual sub-layer to the first FPGA board. The shared memory is preset for the first virtual PCIE device.

In a specific embodiment, the shared memory is preset for each virtual PCIE device created in each PCIE virtual sub-layer, such that the virtual PCIE device interacts with the corresponding virtual machine via the shared memory. Data sending and data receiving are unitedly managed by the PCIE sub-virtual layer. For example, after the data communication between the first virtual machine and the first virtual PCIE device is established, the first virtual machine may send the to-be-processed data to the first virtual PCIE device. The first virtual PCIE device writes the to-be-processed data into the shared memory that is preset for the first virtual PCIE device in the first PCIE virtual sub-layer. Thereby, the to-be-processed data is sent to the corresponding first FPGA board through the first PCIE virtual sub-layer.

As an optional embodiment, the preset shared manner is set by following steps.

A priority is set in advance for each virtual machine sharing the same FPGA board.

The FPGA board performs the data processing according to the priority, in the case that the more than one of the virtual machines configured in the cloud server send respective to-be-processed data simultaneously. The higher the priority of a virtual machine is, the earlier the data from the virtual machine is processed.

In a specific embodiment of the present disclosure, the sharing mode may be configured according to a principle of priority. Namely, the priority of each virtual machine sharing the same FPGA board is configured in advance. Herein the priority represents an order of the FPGA board processing the to-be-processed data from the virtual machines (the to-be-processed data from a virtual machine with higher priority is processed earlier). Therefore, when the multiple virtual machines sharing the same FPGA board send to-be-processed data at the same time, the FPGA board may perform the data processing according to the configured priorities.

Reference is made to FIG. 2 as an example. In a case that the priority of virtual machine 1 is configured to be higher than the priority of virtual machine 2, data from virtual machine 1 is processed before that of virtual machine 2. When virtual machine 1 and virtual machine 2 send the to-be-processed data at the same time, FPGA board 1 first processes the to-be-processed data from virtual machine 1, and processes the to-be-processed data of virtual machine 2 after finishing processing the data from virtual machine 2.

As an optional embodiment, the preset sharing mode is set by a following step.

The FPGA board performs the data processing according to a first-in-first-out rule, in the case that the more than one of the virtual machines configured in the cloud server send respective to-be-processed data simultaneously.

In a specific embodiment of the present disclosure, the sharing mode may be configured according to a principle of "first-in, first-out". Namely, the order of the FPGA board processing data follows the order of the FPGA board receiving the data (i.e. data received first is processed first). Therefore, when multiple virtual machines sharing the same FPGA board send the to-be-processed data at the same time, the FPGA board may process the data according to the first-in-first-out rule.

Reference is made to FIG. 2 as an example. That virtual machine 1 and virtual machine 2 send the to-be-processed data at the same time. In a case that FPGA board 1 first receives the to-be-processed data from virtual machine 1 and then receives that from virtual machine 2, FPGA board 1 first processes the to-be-processed data from virtual machine 1 and then processes that from the virtual machine 2.

As an optional embodiment, the method further includes a following step.

In a case that a sharing relationship among the virtual machines configured in the cloud server is changed, the PCIE virtual layer and the PCIE virtual devices are updated according to the changed sharing relationship.

Further, a user may want to change the sharing relationship among the virtual machines configured in the cloud server. In such case, after the changed sharing relationship (also called a current sharing relationship) among virtual machines is determined, the PCIE virtual layer and the virtual PCIE devices are updated according to the current sharing relationship among the virtual machines (which is similar to the steps of establishing the PCIE virtual layer and creating the virtual PCIE devices in the foregoing embodiments, and is not repeated herein).

Figure 3:
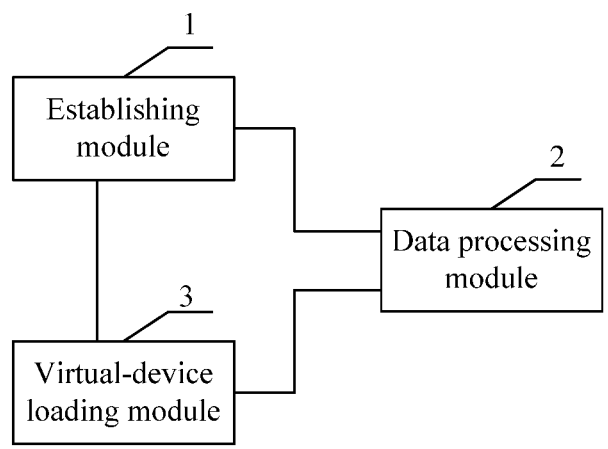
FIG. 3 is a system for sharing a FPGA board among multiple virtual machines according to an embodiment of the present disclosure.

Reference is made to FIG. 3, which is a system for sharing a FPGA board among multiple virtual machines according to an embodiment of the present disclosure.

The system includes an establishing module 1, a virtual device loading module 2, and a data processing module 3.

The establishing module 1 is configured to establish a PCIE virtual layer in a host system of a cloud server in advance. The PCIE virtual layer includes a PCIE virtual sub-layer that is in one-to-one correspondence with a FPGA board, and the FPGA board is an acceleration card shared among virtual machines configured in the cloud server. For each PCIE virtual sub-layer, the establishing module 1 is further configured to select virtual machines interacting with said PCIE virtual sub-layer, from the virtual machines configured in the cloud server in advance. The establishing module 1 is further configured to create virtual PCIE devices in each PCIE virtual sub-layer. The virtual PCIE devices are in one-to-one correspondence with the virtual machines interacting with said PCIE virtual sub-layer.

The virtual-device loading module 2 is configured to load a first virtual PCIE device onto a first virtual machine of the virtual machines configured in the cloud server, after the first virtual machine is activated. The first virtual PCIE device is in a first PCIE virtual sub-layer, and corresponds to the first virtual machine.

The data processing module 3 is configured to receive to-be-processed data from the first virtual machine, via the first virtual PCIE device. The data processing module 3 is further configured to send the to-be-processed data through the first PCIE virtual sub-layer to a first FPGA board corresponding to the first PCIE virtual sub-layer. Thereby, in a case that more than one of the virtual machines configured in the cloud server send respective to-be-processed data simultaneously, the first FPGA board is enabled to perform data processing according to a preset sharing mode and return the processed data correspondingly to the virtual machines configured in the cloud server.

As an optional embodiment, the establishing module 1 includes a quantity acquiring unit, a virtual-machine allocating unit, a virtual-device establishing unit, and a virtual-device creating unit.

The quantity acquiring unit is configured to acquire a quantity of FPGA boards provided for the virtual machines configured in the cloud server, and acquire a quantity of the virtual machines configured in the cloud server.

In a case that to the quantity of the FPGA boards being less than the quantity of the virtual machines, the virtual-machine allocating unit is configured to determine, from all FPGA boards, the FPGA board that is shared among more than one of the virtual machines configured in the cloud server. In such case, the virtual-machine allocating unit is further configured to determine, from all virtual machines, virtual machines sharing the FPGA board. Thereby, each virtual machine is allocated to one of the FPGA boards.

The virtual-device establishing unit is configured to create the PCIE virtual layer in the host system of the cloud server. The PCIE virtual layer includes the PCIE virtual sub-layer that is in one-to-one correspondence with the FPGA board shared among more than one of the virtual machines.

The virtual-device creating unit is configured to determine, for each PCIE virtual sub-layer, the virtual machines interacting with said PCIE virtual sub-layer, according to a result of the allocation. The virtual-device creating unit is further configured to create, in each PCIE virtual sub-layer, the virtual PCIE devices that are in one-to-one correspondence with the virtual machines interacting with said PCIE virtual sub-layer.

As an optional embodiment, the system further includes an updating module. The updating module is configured to update, in a case that a sharing relationship among the virtual machines configured in the cloud server is changed, the PCIE virtual layer and the PCIE virtual devices according to the changed sharing relationship.

Introduction of the system refers to the forgoing method embodiments, and is not further described herein.

An apparatus for sharing a FPGA board among multiple virtual machines is further provided according to embodiments of the present disclosure. The apparatus includes a memory and a processor.

The memory is configured to store a computer program.

The processor is configured to implement any foregoing method for sharing the FPGA board among the multiple virtual machines, when executing the computer program.

Introduction of the apparatus refers to the forgoing method embodiments, and is not further described herein.

It should be noted that, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The above description of the embodiments enables those skilled in the art to implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but in accordance with the widest scope consistent with the principle and novel features disclosed herein.

The invention claimed is:

1. A method for sharing a field-programmable gate array (FPGA) board among a plurality of virtual machines, comprising:
    establishing a peripheral component interface express (PCIE) virtual layer in a host system of a cloud server in advance, wherein the PCIE virtual layer comprises one or more PCIE virtual sub-layers that are in first one-to-one correspondence with one or more FPGA boards, and each of the one or more FPGA boards is an acceleration card shared among virtual machines configured in the cloud server;
    selecting, for each PCIE virtual sub-layer, virtual machines interacting with said PCIE virtual sub-layer, from the virtual machines configured in the cloud server in advance;
    creating, in each PCIE virtual sub-layer, virtual PCIE devices that are in second one-to-one correspondence with the virtual machines interacting with said PCIE virtual sub-layer;
    loading a first virtual PCIE device onto a first virtual machine of the virtual machines configured in the cloud server, after the first virtual machine is activated, wherein the first virtual PCIE device is in a first PCIE virtual sub-layer of the one or more PCIE virtual sub-layers, and corresponds to the first virtual machine in the second one-to-one correspondence;
    receiving, via the first virtual PCIE device, to-be-processed data from the first virtual machine; and
    sending, through the first PCIE virtual sub-layer, the to-be-processed data to a first FPGA board corresponding to the first PCIE virtual sub-layer;

wherein in response to more than one virtual machines comprising the first virtual machine sending respective to-be-processed data to the first FPGA board simultaneously, the method further comprises:

processing, by the first FPGA board according to a preset sharing mode, the to-be-processed data sent from the more than one virtual machines; and returning, by the first FPGA board, the processed to-be-processed data correspondingly to the more than one virtual machines.

2. The method according to claim 1, wherein before establishing the PCIE virtual layer in the host system of the cloud server in advance, the method further comprises:

acquiring a first quantity of FPGA boards provided for the virtual machines configured in the cloud server, and a second quantity of the virtual machines configured in the cloud server; and allocating each of the virtual machines configured in the cloud server to one of the FPGA boards, in response to the first quantity being less than the second quantity;

wherein the allocating comprises:
determining, from all FPGA boards, the one or more FPGA boards, and
determining, from all virtual machines, virtual machines sharing each of the one or more FPGA boards; and wherein the selecting comprises: determining, for each PCIE virtual sub-layer, the virtual machines interacting with said PCIE virtual sub-layer, according to a result of the allocating.

3. The method according to claim 1, wherein before sending the to-be-processed data to the first FPGA board, the method further comprises:

writing the to-be-processed data into a shared memory in the first PCIE virtual sub-layer, wherein the shared memory is preset for the first virtual PCIE device.

4. The method according to claim 3, wherein the preset sharing mode is set by:

setting a priority in advance for each virtual machine sharing the same FPGA board, and performing, by the FPGA board, the data processing according to the priority, wherein the higher the priority of a virtual machine is, the earlier the to-be-processed data from the virtual machine is processed in the data processing.

5. The method according to claim 3, wherein the preset sharing mode is set by:

performing, by the FPGA board, the data processing according to a first-in-first-out rule.

6. The method according to claim 1, further comprising:
updating, in response to a sharing relationship among the virtual machines configured in the cloud server being changed, the PCIE virtual layer and the PCIE virtual devices according to the changed sharing relationship.

7. An apparatus for sharing a field-programmable gate array (FPGA) board among a plurality of virtual machines, comprising:

a memory, configured to store a computer program, and
a processor, configured to execute the computer program to perform:

establishing a peripheral component interface express (PCIE) virtual layer in a host system of a cloud server in advance, wherein the PCIE virtual layer comprises one or more PCIE virtual sub-layers that are in first one-to-one correspondence with one or more FPGA boards, and each of the one or more FPGA boards is an acceleration card shared among virtual machines configured in the cloud server;

selecting, for each PCIE virtual sub-layer, virtual machines interacting with said PCIE virtual sub-layer, from the virtual machines configured in the cloud server in advance;

creating, in each PCIE virtual sub-layer, virtual PCIE devices that are in second one-to-one correspondence with the virtual machines interacting with said PCIE virtual sub-layer;

loading a first virtual PCIE device onto a first virtual machine of the virtual machines configured in the cloud server, after the first virtual machine is activated, wherein the first virtual PCIE device is in a first PCIE virtual sub-layer of the one or more PCIE virtual sub-layers, and corresponds to the first virtual machine in the second one-to-one correspondence;

receiving, via the first virtual PCIE device, to-be-processed data from the first virtual machine; and sending, through the first PCIE virtual sub-layer, the to-be-processed data to a first FPGA board corresponding to the first PCIE virtual sub-layer;

wherein the processor is further configured to execute the computer program to perform: in response to more than one virtual machines comprising the first virtual machine sending respective to-be-processed data to the first FPGA board simultaneously, processing, by the first FPGA board according to a preset sharing mode, the to-be-processed data sent from the more than one virtual machines; and returning, by the first FPGA board, the processed to-be-processed data correspondingly to the more than one virtual machines.

8. The apparatus according to claim 7, wherein the processor is further configured to execute the computer program to perform:

before establishing the PCIE virtual layer in the host system of the cloud server in advance, acquiring a first quantity of FPGA boards provided for the virtual machines configured in the cloud server, and a second quantity of the virtual machines configured in the cloud server; and allocating each of the virtual machines configured in the cloud server to one of the FPGA boar s, in response to the first quantity being less than the second quantity;

wherein the allocating comprises:
determining, from all FPGA boards, the one or more FPGA boards, and
determining, from all virtual machines, virtual machines sharing each of the one or more FPGA boards; and wherein the selecting comprises: determining, for each PCIE virtual sub-layer, the virtual machines interacting with said PCIE virtual sub-layer, according to a result of the allocating.

9. The apparatus according to claim 7, wherein the processor is further configured to execute the computer program to perform:

before sending the to-be-processed data to the first FPGA board, writing the to-be-processed data into a shared memory in the first PCIE virtual sub-layer, wherein the shared memory is preset for the first virtual PCIE device.

10. The apparatus according to claim 9, wherein the preset sharing mode is set by:

setting a priority in advance for each virtual machine sharing the same FPGA board, and performing, by the FPGA board, the data processing according to the priority, wherein the high r the priority of a virtual machine is, the earlier the to-be-processed data from the virtual machine is processed in the data processing.

11. The apparatus according to claim 9, wherein the preset sharing mode is set by:
performing, by the FPGA board, the data processing according to a first-in-first-out rule.

12. The apparatus according to claim 7, wherein the processor is further configured to execute the computer program to perform:
updating, in response to a sharing relationship among the virtual machines configured in the cloud server being changed, the PCIE virtual layer and the PCIE virtual devices according to the changed sharing relationship.

* * * * *